A. J. CURTIS.
Harvester Guard Finger.
No. 209,465.    Patented Oct. 29, 1878.
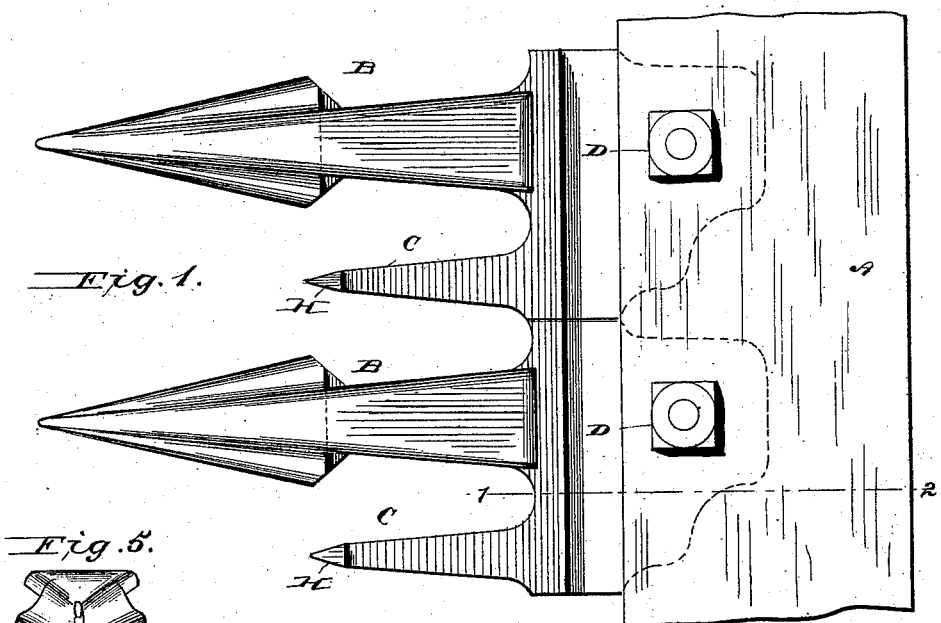
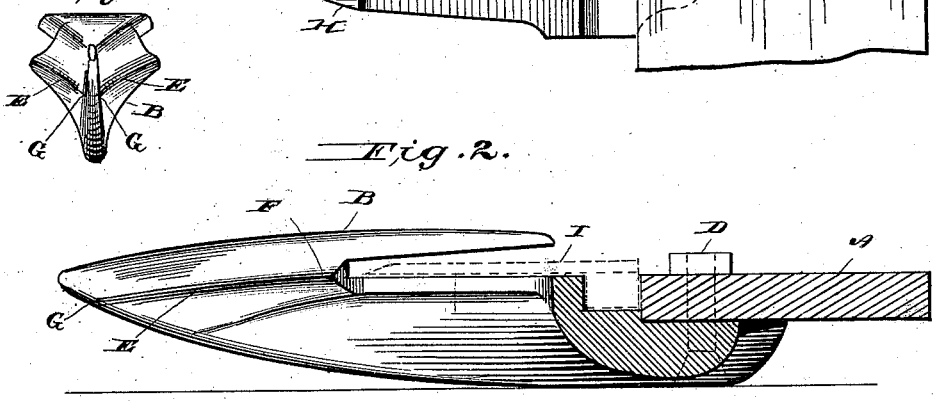
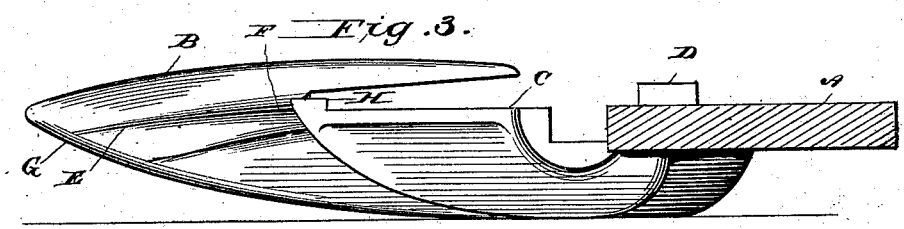

UNITED STATES PATENT OFFICE.

ANDREW J. CURTIS, OF EAST WILLIAMSON, NEW YORK.

IMPROVEMENT IN HARVESTER GUARD-FINGERS.

Specification forming part of Letters Patent No. 209,465, dated October 29, 1878; application filed June 7, 1878.

*To all whom it may concern:*

Be it known that I, ANDREW J. CURTIS, of East Williamson, in the county of Wayne and State of New York, have invented certain new and useful Improvements in Harvester-Fingers; and I do hereby declare that the following is a full, clear, and exact description thereof.

This invention relates to certain improvements in harvester-fingers; and the invention consists in the special construction and combination of parts, which will be hereinafter more fully set forth.

In order to enable others skilled in the art to which my invention appertains to make and use the same, I will now proceed to describe its construction and operation, reference being had to the accompanying drawing, which forms a part of this specification, and in which—

Figure 1 is a top view. Figs. 2 and 3 are side views of the fingers. Fig. 4 is a perspective view, and Fig. 5 is a view looking at the point of one of the fingers.

In the drawing, A represents the finger-bar, which may be constructed in any suitable manner. The large guard, B, and small or intermediate guard, C, which are preferably constructed in one piece, are secured to the finger-bar A by bolts D, or in any other suitable manner. The large guards, B, are formed on opposite sides with blades or webs E. These webs E converge or taper toward the point or end of the guard, and incline from an elevated point, F, down to a suitable point, G, below the end or point of the guard, as shown in Figs. 2, 3, and 4. The intermediate guards, C, are formed at their points with an elevation, H, as shown in Figs. 1 and 3, in order to prevent grass or sticks getting under the blade I, and thereby interfering with or preventing its free movement.

Objection is made to harvester-fingers as heretofore constructed, for the reason that they do not afford sufficient protection to the cutting-knife, or, owing to the webs being arranged in a horizontal position on the guards, they bear or ride the grass down. These objections I have overcome by forming the web in an inclined position, which prevents the grass or grain from being ridden down or slipping before the knife. It also serves as an additional protection to the knife from stones and other obstructions.

In operation, the knife slides from one large guard, B, to the other. The intermediate guard, C, divides the grass or grain, thereby obviating the full resistance in making the cut, and serving, with the inclined webs E, to prevent grass being tangled around the guards.

Having thus fully described my invention, what I claim as new, and desire to secure by Letters Patent, is—

1. A harvester-finger formed on opposite sides with a web, E, inclining from a point, F, down to a point, G, back of and below the point of the finger, as shown, said webs also converging forwardly, as set forth.

2. The combination of an intermediate finger, C, with a finger, B, constructed with converging webs E, said webs inclining from an elevated point, F, down to a point, G, back of and below the point of the finger, as shown and described.

In testimony that I claim the foregoing as my own I affix my signature in presence of two witnesses.

ANDREW J. CURTIS.

Witnesses:
 MAURICE B. SWEETING,
 GEORGE B. MAINES.